(12) United States Patent
Lee et al.

(10) Patent No.: US 9,790,357 B2
(45) Date of Patent: Oct. 17, 2017

(54) THERMOPLASTIC RESIN COMPOSITION WITH EXCELLENT HEAT RESISTANCE AND MOLDED ARTICLE MANUFACTURED USING THE SAME

(71) Applicant: Samsung SDI Co., Ltd., Yongin-si (KR)

(72) Inventors: Jeong Min Lee, Uiwang-si (KR); Kee Hae Kwon, Uiwang-si (KR); Jeong Eun Park, Uiwang-si (KR); Chang Min Hong, Uiwang-si (KR); Jae Youp Chung, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/143,722

(22) Filed: May 2, 2016

(65) Prior Publication Data

US 2016/0326358 A1     Nov. 10, 2016

(30) Foreign Application Priority Data

May 4, 2015  (KR) .................. 10-2015-0062461
Mar. 22, 2016  (KR) .................. 10-2016-0034283

(51) Int. Cl.
*C08L 25/12* (2006.01)
*C08L 67/03* (2006.01)
*C08L 69/00* (2006.01)

(52) U.S. Cl.
CPC ............... *C08L 25/12* (2013.01); *C08L 67/03* (2013.01); *C08L 69/00* (2013.01)

(58) Field of Classification Search
CPC ........... C08L 67/03; C08L 69/00; C08L 25/12
See application file for complete search history.

(56) References Cited

U.S. PATENT DOCUMENTS

| 7,786,196 B2 | 8/2010 | Jung et al. | |
| 2009/0062436 A1* | 3/2009 | Breiner | C08K 5/523 |
| | | | 524/117 |
| 2010/0152358 A1* | 6/2010 | Jung | C08F 279/04 |
| | | | 524/504 |

FOREIGN PATENT DOCUMENTS

KR        0804173 B1    2/2008

* cited by examiner

*Primary Examiner* — Peter D Mulcahy
(74) *Attorney, Agent, or Firm* — Additon, Higgins & Pendleton, P.A.

(57) ABSTRACT

A heat resistant thermoplastic resin composition and a molded article manufactured using the same. The heat resistant thermoplastic resin composition includes about 100 parts by weight of an aromatic vinyl compound; about 20 parts by weight to about 60 parts by weight of a polycarbonate resin; and about 30 parts by weight to about 60 parts by weight of an impact modifier. The heat resistant thermoplastic resin composition and a molded article manufactured using the same can have excellent properties in terms of impact resistance, heat resistance, and/or chemical resistance and can be eco-friendly due to low level of VOC emissions.

20 Claims, No Drawings

THERMOPLASTIC RESIN COMPOSITION WITH EXCELLENT HEAT RESISTANCE AND MOLDED ARTICLE MANUFACTURED USING THE SAME

CROSS-REFERENCE TO RELATED APPLICATION

This application claims priority under 35 USC Section 119 to and the benefit of Korean Patent Application 10-2015-0062461, filed May 4, 2015, and Korean Patent Application 10-2016-0034283, filed Mar. 22, 2016, the entire disclosure of each of which is incorporated herein by reference.

FIELD

The present invention relates to a heat resistant thermoplastic resin composition and a molded article manufactured using the same.

BACKGROUND

A thermoplastic resin has lower specific gravity than glass or metal and has excellent moldability and mechanical properties such as impact resistance. Plastic products using such a thermoplastic resin are rapidly replacing glass or metal products in the fields of electric/electronic products and automotive parts.

Particularly, an acrylonitrile-butadiene-styrene copolymer (ABS) resin is widely used in electric/electronic products and automotive parts due to excellent impact resistance and moldability.

An interior material for an automobile requires heat resistance depending on usage characteristics of parts, since the internal temperature of the automobile rises in summer. Although a modified styrene-acrylonitrile copolymer (SAN) resin having high heat resistance has been used to supplement heat resistance of an ABS resin, use of such a modified SAN resin can cause deterioration in impact resistance and moldability.

In addition, volatile organic compounds (VOCs) can be continuously emitted from such a modified SAN resin, which can result in a bad smell in an automobile, and thus can affect the human body, and also can cause surfaces of parts to become hazy, which can deteriorate transparency of the parts, the transparency of which needs to be maintained at a constant level.

Therefore, there is a need for a heat resistant thermoplastic resin composition which is eco-friendly, for example, by virtue of use of recycled resins and/or low level of VOC emissions, while maintaining excellent properties.

SUMMARY OF THE INVENTION

Exemplary embodiments provide a heat resistant thermoplastic resin composition which can be eco-friendly due to considerably low level of VOC emissions and can give equal performance despite use of recycled polycarbonate and polyethylene terephthalate resins while exhibiting excellent properties in terms of chemical resistance, heat resistant, and/or impact resistance, and a molded article manufactured using the same.

The heat resistant thermoplastic resin composition can include: about 100 parts by weight of an aromatic vinyl compound; about 20 parts by weight to about 60 parts by weight of a polycarbonate resin; and about 30 parts by weight to about 60 parts by weight of an impact modifier.

In exemplary embodiments, the heat resistant thermoplastic resin composition may further include a polyethylene terephthalate resin.

In exemplary embodiments, the polyethylene terephthalate resin may be present in an amount of about 15 to about 55 parts by weight based on about 100 parts by weight of the aromatic vinyl compound.

In exemplary embodiments, the impact modifier may be a rubber-modified aromatic vinyl copolymer.

In exemplary embodiments, the rubber-modified aromatic vinyl copolymer may include a rubber polymer having an average particle diameter of about 200 nm to about 400 nm in an amount of about 40 wt % to about 60 wt % based on the total weight of the rubber-modified aromatic vinyl copolymer.

In exemplary embodiments, the polycarbonate resin may be a recycled polycarbonate resin.

In exemplary embodiments, the polyethylene terephthalate resin may be a recycled polyethylene terephthalate resin.

In exemplary embodiments, the heat resistant thermoplastic resin composition may further include inorganic fillers in an amount of about 0.5 parts by weight to about 4 parts by weight based on about 100 parts by weight of the aromatic vinyl compound.

In exemplary embodiments, the aromatic vinyl compound may include at least one of an aromatic vinyl-vinyl cyanide copolymer and/or a heat resistant modified vinyl copolymer.

In exemplary embodiments, the heat resistant modified vinyl copolymer may include a repeat unit derived from a monomer comprising α-methylstyrene, maleic anhydride, nucleus-substituted maleimide, N-substituted phenyl maleimide, or a combination thereof.

In exemplary embodiments, a weight ratio of the aromatic vinyl-vinyl cyanide copolymer to the heat resistant modified vinyl copolymer may range from about 1.5:about 1 to about 4:about 1.

In exemplary embodiments, the heat resistant thermoplastic resin composition may have a heat deflection temperature (HDT) of about 104° C. or higher, as measured on an about 6.4 mm thick specimen at a load of about 18.56 kgf/cm$^2$ in accordance with ASTM D648 and may have a notched Izod impact strength of about 20 kgf·cm/cm to about 40 kgf·cm/cm, as measured in accordance with ASTM D256.

In exemplary embodiments, the heat resistant thermoplastic resin composition may have a level of VOC emissions of about 120 areas or less, as measured by a process in which about 2 g of pellets prepared from the heat resistant thermoplastic resin composition are left at 120° C. for 5 hours using a static headspace sampler and a generation amount of VOCs is measured by gas chromatography, followed by representing the amount by peak area according to time.

In exemplary embodiments, the heat resistant thermoplastic resin composition may have a level of VOC emissions of about 400 ppm or less, as measured by a process in which about 4 g of pellets prepared from the heat resistant thermoplastic resin composition are placed in a petri dish and the dish is covered with a lid to be sealed off and left at 250° C. for about 3 hours, followed by measuring a weight of a deposit on the lid and converting the measured value into ppm.

Other embodiments relate to a molded article manufactured using the heat resistant thermoplastic resin composition as set forth above.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and a thorough understanding of the present invention by those skilled in the art. The scope of the present invention is defined only by the claims.

A heat resistant thermoplastic resin composition according to the present invention can exhibit excellent properties in terms of chemical resistance, heat resistance, and impact resistance while having a low level of VOC emissions, and includes (A) an aromatic vinyl compound; (B) a polycarbonate resin; and (C) an impact modifier.

(A) Aromatic Vinyl Compound

The aromatic vinyl compound can reduce VOC emissions from the heat resistant thermoplastic resin composition while improving chemical resistance and heat resistance of the resin composition, and may include (A-1) an aromatic vinyl-vinyl cyanide copolymer, (A-2) a heat resistant modified vinyl copolymer, and/or a combination thereof.

In exemplary embodiments, the aromatic vinyl-vinyl cyanide copolymer (A-1) may be a typical copolymer of an aromatic vinyl compound and a vinyl cyanide compound.

Examples of the aromatic vinyl compound may include without limitation styrene, α-methylstyrene, halogen and/or C1-C10 alkyl-substituted styrene, and the like, and combinations thereof. Examples of the vinyl cyanide compound may include without limitation acrylonitrile, methacrylonitrile, fumaronitrile, and the like, and combinations thereof. For example, the aromatic vinyl compound may be styrene; the vinyl cyanide compound may be acrylonitrile; and the aromatic vinyl-vinyl cyanide copolymer may be a styrene-acrylonitrile copolymer (SAN).

In exemplary embodiments, the aromatic vinyl-vinyl cyanide copolymer may be copolymerized from a monomer mixture including about 60 wt % to about 80 wt %, for example, about 65 to about 80 wt %, of the aromatic vinyl compound and about 20 wt % to about 40 wt %, for example, about 20 wt % to about 35 wt %, of the vinyl cyanide compound.

The aromatic vinyl-vinyl cyanide copolymer can include the aromatic vinyl compound in an amount of about 60, 61, 62, 63, 64, 65, 66, 67, 68, 69, 70, 71, 72, 73, 74, 75, 76, 77, 78, 79, or 80 wt %. Further, according to some embodiments of the present invention, the aromatic vinyl compound can be present in an amount of from about any of the foregoing amounts to about any other of the foregoing amounts.

The aromatic vinyl-vinyl cyanide copolymer can include the vinyl cyanide compound in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the vinyl cyanide compound can be present in an amount of from about any of the foregoing amounts to about any other of the foregoing amounts.

Within this range, the heat resistant thermoplastic resin composition can exhibit excellent compatibility between the components thereof.

In exemplary embodiments, the aromatic vinyl compound may include the heat resistant modified vinyl copolymer (A-2) to further improve heat resistance.

In exemplary embodiments, the heat resistant modified vinyl copolymer (A-2) may include a repeat unit derived from a monomer including at least one of α-methylstyrene, maleic anhydride, nucleus-substituted maleimide, and/or N-substituted phenyl maleimide.

In exemplary embodiments, when the aromatic vinyl compound (A) is a combination of the vinyl cyanide-aromatic vinyl copolymer (A-1) and the heat resistant modified vinyl copolymer (A-2), a weight ratio of the vinyl cyanide-aromatic vinyl copolymer to the heat resistant modified copolymer ((A-1):(A-2)) may range from about 1.5:about 1 to about 4:about 1, for example, about 2:about 1 to about 3:about 1. Within this range of weight ratio, the heat resistant thermoplastic resin composition can have better heat resistance.

In exemplary embodiments, the aromatic vinyl compound (A) may have a weight average molecular weight (Mw) of about 50,000 g/mol to about 300,000 g/mol, for example, about 55,000 g/mol to about 200,000 g/mol, as measured by gel permeation chromatography (GPC).

(B) Polycarbonate Resin

The polycarbonate resin may be a typical aromatic polycarbonate resin. For example, the polycarbonate resin may be an aromatic polycarbonate resin prepared by reacting phosgene, halogen formate, and/or carbonic diester with one or more diphenols (aromatic dihydroxy compounds) represented by Formula 1:

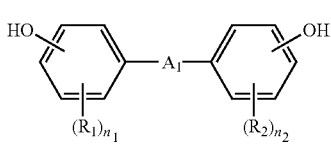

[Formula 1]

wherein $A_1$ is a single bond, a substituted or unsubstituted $C_1$ to $C_5$ alkylene group, a substituted or unsubstituted $C_2$ to $C_5$ alkylidene group, a substituted or unsubstituted $C_3$ to $C_6$ cycloalkylene group, a substituted or unsubstituted $C_5$ to $C_6$ cycloalkylidene group, CO, S, or $SO_2$; $R_1$ and $R_2$ are the same or different and are each independently a substituted or unsubstituted $C_1$ to $C_{30}$ alkyl group or a substituted or unsubstituted $C_6$ to $C_{30}$ aryl group; and $n_1$ and $n_2$ are the same or different and are each independently an integer from 0 to 4.

As used herein, the term "substituted" means that a hydrogen atom in a functional group is substituted with a substituent selected from the group consisting of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, and combinations thereof.

Examples of the diphenols may include without limitation hydroquinone, resorcinol, 4,4'-dihydroxyphenyl, 2,2-bis(4-hydroxyphenyl)propane, 2,4-bis(4-hydroxyphenyl)-2-methylbutane, 1,1-bis(4-hydroxyphenyl)cyclohexane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and the like, and combinations thereof. For example, the diphenol may include 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, and/or 1,1-bis(4-hydroxyphenyl)cyclohexane, for example 2,2-bis(4-hydroxyphenyl)propane, which is also referred to as bisphenol A.

In exemplary embodiments, the polycarbonate resin may be a branched polycarbonate resin. For example, the branched polycarbonate resin may be a polycarbonate resin prepared by adding a tri- or higher polyfunctional compound, for example, a tri- or higher valent phenol group-containing compound in an amount of about 0.05 mol % to about 2 mol % based on the total number of moles of the diphenols which are used in polymerization.

In exemplary embodiments, the polycarbonate resin may be a homopolycarbonate resin, a copolycarbonate resin, or a blend thereof.

The polycarbonate resin may be partly or completely replaced by an aromatic polyester-carbonate resin obtained by polymerization in the presence of an ester precursor, for example, bifunctional carboxylic acid.

In exemplary embodiments, the polycarbonate resin may be a polycarbonate resin recycled from waste polycarbonate. As used herein, the term "waste polycarbonate" refers to spent polycarbonate resins such as waste water bottles and may be waste polycarbonate used twice or more.

In exemplary embodiments, the polycarbonate resin may have a weight average molecular weight (Mw) of about 10,000 g/mol to about 200,000 g/mol, for example, about 15,000 g/mol to about 80,000 g/mol, as measured by GPC, without being limited thereto.

The heat resistant thermoplastic resin composition can include the polycarbonate resin in an amount of about 20 parts by weight to about 60 parts by weight, for example, about 25 parts by weight to about 55 parts by weight, based on about 100 parts by weight of the aromatic vinyl compound. In some embodiments, the heat resistant thermoplastic resin composition can include the polycarbonate resin in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments of the present invention, the polycarbonate resin can be present in an amount of from about any of the foregoing amounts to about any other of the foregoing amounts.

If the amount of the polycarbonate resin is less than about 20 parts by weight, it can be difficult to use the heat resistant thermoplastic resin composition as interior materials for vehicles due to poor heat resistance, whereas if the amount exceeds about 60 parts by weight, there is a concern of deterioration in moldability of the heat resistant thermoplastic resin composition.

(C) Impact Modifier

The impact modifier can serve to improve impact resistance of the heat resistant thermoplastic resin composition by including a rubber polymer and may be any suitable material so long as the material can be mixed with the aromatic vinyl compound and the polycarbonate resin. For example, the impact modifier may be a rubber-modified aromatic vinyl graft copolymer and/or a rubber-modified aromatic vinyl copolymer having the form of a resin polymer in which rubber-modified vinyl graft polymer particles are dispersed in a matrix (i.e. continuous phase) composed of a copolymer of vinyl monomers.

In exemplary embodiments, the rubber-modified aromatic vinyl graft copolymer may be prepared by adding an aromatic vinyl monomer and a vinyl monomer copolymerizable with the aromatic vinyl monomer in the presence of a rubber polymer, followed by graft-copolymerization. Here, graft-copolymerization may be performed by any typical known polymerization method such as emulsion polymerization, solution polymerization, suspension polymerization, and mass polymerization.

Examples of the rubber-modified aromatic vinyl copolymer may include without limitation acrylonitrile-butadiene-styrene copolymer (ABS) resin, an acrylonitrile-styrene-acrylate copolymer (ASA) resin, an acrylonitrile-ethylene/propylene rubber-styrene copolymer (AES) resin, a methyl methacrylate-butadiene-styrene copolymer (MBS) resin, and the like, and combinations thereof.

Examples of the rubber polymer may include: diene rubbers such as polybutadiene, a styrene-butadiene copolymer, and/or an acrylonitrile-butadiene copolymer; saturated rubbers obtained by adding hydrogen to the diene rubbers and/or isoprene rubbers; acrylic rubbers such as butyl acrylate rubbers; ethylene-propylene-diene monomer terpolymers (EPDM), and the like, and combinations thereof without being limited thereto. For example, the rubber polymer may include polybutadiene, which is a diene rubber.

In exemplary embodiments, the rubber-modified aromatic vinyl copolymer can include the rubber polymer in an amount of about 40 wt % to about 60 wt %, for example, about 45 wt % to about 58 wt %, based on the total weight (100 wt %) of the rubber-modified aromatic vinyl copolymer. In some embodiments, the rubber-modified aromatic vinyl copolymer can include the rubber polymer in an amount of about 40, 41, 42, 43, 44, 45, 46, 47, 48, 49, 50, 51, 52, 53, 54, 55, 56, 57, 58, 59, or 60 wt %. Further, according to some embodiments of the present invention, the rubber polymer can be present in an amount of from about any of the foregoing amounts to about any other of the foregoing amounts.

Within this range, the rubber polymer can improve impact resistance and/or compatibility of the heat resistant thermoplastic resin composition with minimal or no deterioration in other properties.

In addition, the rubber polymer may have an average particle diameter of about 200 nm to about 400 nm, for example, about 250 nm to about 350 nm, and as another example about 250 nm to about 320 nm. Within this range, the heat resistant thermoplastic resin composition can have excellent properties in terms of impact resistance and the like. As used herein, the term "average particle diameter" refers to D50 (a diameter at a distribution rate of 50%) which is a number average particle diameter.

Examples of the aromatic vinyl monomer graft-copolymerizable with the rubber polymer may include without limitation styrene, α-methylstyrene, nucleus-substituted styrene, and the like, and combinations thereof. For example, the aromatic vinyl monomer graft-copolymerizable with the rubber polymer may include styrene. Examples of the monomer copolymerizable with the aromatic vinyl monomer may include without limitation acrylonitrile, methacrylonitrile, methyl methacrylate, N-substituted maleimide, maleic anhydride, and the like, and combinations thereof. For example, the monomer copolymerizable with the aromatic vinyl monomer may include acrylonitrile.

The heat resistant thermoplastic resin composition can include the impact modifier in an amount of about 30 parts by weight to about 60 parts by weight, for example, about 35 parts by weight to about 50 parts by weight, based on about 100 parts by weight of the aromatic vinyl compound. In some embodiments, the heat resistant thermoplastic resin composition can include the impact modifier in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight. Further, according to some embodiments of the present invention, the impact modifier can be present in an amount of from about any of the foregoing amounts to about any other of the foregoing amounts.

If the amount of the impact modifier is less than about 30 parts by weight, the heat resistant thermoplastic resin composition can have poor impact resistance, whereas if the amount of the impact modifier exceeds about 60 parts by weight, the heat resistant thermoplastic resin composition can have poor heat resistance.

(D) Polyethylene Terephthalate Resin

The heat resistant thermoplastic resin composition may further include a polyethylene terephthalate resin.

Examples of the polyethylene terephthalate resin may include without limitation polyethylene terephthalate (PET), modified PET including one or more other additional monomers such as polytetramethylene glycol (PTMG) and/or polypropylene glycol (PPG), copolymers of aliphatic polyester and/or aliphatic polyamide and polyethylene terephthalate (PET), and the like, and combinations thereof.

In exemplary embodiments, the polyethylene terephthalate resin may be a polyethylene terephthalate resin recycled from waste polyethylene terephthalate. Here, the term "waste polycarbonate" refers to spent polyethylene terephthalate resins such as waste PET bottles and may be waste polyethylene terephthalate resins used twice or more.

The heat resistant thermoplastic resin composition can include the polyethylene terephthalate resin in an amount of about 15 parts by weight to about 55 parts by weight, for example, about 20 parts by weight to about 50 parts by weight, based on about 100 parts by weight of the aromatic vinyl compound. In some embodiments, the heat resistant thermoplastic resin composition can include the polyethylene terephthalate resin in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55 parts by weight. Further, according to some embodiments of the present invention, the polyethylene terephthalate resin can be present in an amount of from about any of the foregoing amounts to about any other of the foregoing amounts.

Within this range, the heat resistant thermoplastic resin composition can exhibit better properties in terms of chemical resistance, heat resistance, impact resistance, and the like.

(E) Inorganic Fillers

The heat resistant thermoplastic resin composition may further include inorganic fillers to further improve dimensional stability of the resin composition.

Examples of the inorganic fillers may include without limitation talc, mica, glass fibers, glass beads, glass flakes, carbon black, clay, kaolin, and the like, and combinations thereof. For example, the inorganic fillers may include talc, mica, or a mixture thereof, for example talc.

The inorganic fillers may have a spherical, flake, and/or cylindrical shape, and may have an average particle diameter of about 0.5 μm to about 2.5 μm, without being limited thereto.

The heat resistant thermoplastic resin composition can include the inorganic fillers in an amount of about 0.5 parts by weight to about 4 parts by weight, for example, about 0.5 parts by weight to about 2 parts by weight, based on about 100 parts by weight of the aromatic vinyl compound. In some embodiments, the heat resistant thermoplastic resin composition can include the inorganic fillers in an amount of about 0.5, 0.6, 0.7, 0.8, 0.9, 1, 2, 3, or 4 parts by weight. Further, according to some embodiments of the present invention, the inorganic fillers can be present in an amount of from about any of the foregoing amounts to about any other of the foregoing amounts Within this range, the inorganic fillers can improve dimensional stability of the heat resistant thermoplastic resin composition with minimal or no deterioration in other properties.

In exemplary embodiments, the heat resistant thermoplastic resin composition may have a heat deflection temperature (HDT) of about 104° C. or higher, for example, about 104° C. to about 110° C., as measured on an about 6.4 mm thick specimen at a load of about 18.56 kgf/cm$^2$ in accordance with ASTM D648.

In exemplary embodiments, the heat resistant thermoplastic resin composition may have a level of VOC emissions of about 120 areas or less, as measured by a process in which about 2 g of pellets prepared from the heat resistant thermoplastic resin composition are left at 120° C. for 5 hours using a static headspace sampler and a generation amount of VOCs is measured by gas chromatography, followed by representing the amount by peak area according to time.

In exemplary embodiments, the heat resistant thermoplastic resin composition may have a notched Izod impact strength of about 20 kgf·cm/cm to about 40 kgf·cm/cm, for example, about 22 kgf·cm/cm to about 35 kgf·cm/cm, as measured in accordance with ASTM D256.

In exemplary embodiments, the heat resistant thermoplastic resin composition may have a level of VOC emissions about 400 ppm or less, for example, about 200 ppm to about 330 ppm, and as another example about 290 ppm to about 330 ppm, as measured by a process in which about 4 g of pellets prepared from the heat resistant thermoplastic resin composition are placed in a petri dish, which in turn is covered with a lid to be sealed off and left at 250° C. for about 3 hours, followed by measuring a weight of a deposit on the lid and converting the measured value into ppm.

From the above property values obtained by several tests, it can be seen that the numerical limitations as described above can have critical significance in that the heat resistant thermoplastic resin composition can have excellent properties in terms of impact resistance, chemical resistance, heat stability, and/or eco-friendliness.

A molded article according to the present invention can be manufactured using the heat resistant thermoplastic resin composition as set forth above. The heat resistant thermoplastic resin composition may be prepared by any suitable method known in the art. For example, the aforementioned components and, optionally, the additives, can be mixed, followed by melt extrusion in an extruder, thereby preparing a thermoplastic resin composition in pellet form. The prepared pellets may be produced into various molded articles (products) by various molding methods such as injection molding, extrusion, vacuum molding, and casting. Such molding methods are well known to those skilled in the art to which the present invention pertains. The molded article may be applied to various fields such as a variety of electric/electronic products and automotive parts, for example, can be useful as interior materials for an automobile.

Next, the present invention will be described in more detail with reference to the following examples. However, it should be noted that these examples are provided for illustration only and should not be construed in any way as limiting the invention.

EXAMPLES

Details of components used in the following Examples and Comparative Examples are as follows:

(A) Aromatic Vinyl Compound (A-1) Aromatic Vinyl-Vinyl Cyanide Copolymer

A styrene-acrylonitrile copolymer (SAN) resin having an acrylonitrile content of 24 wt % and a styrene content of 76 wt % and having a weight average molecular weight of about 120,000 g/mol is used.

(A-2) Heat Resistant Modified Vinyl Copolymer

A phenyl maleimide-styrene-maleic anhydride copolymer having a weight average molecular weight of about 150,000 g/mol (Denka IP MS-NA, Denka Co., Ltd.) is used.

(B) Polycarbonate Resin (B-1) Polycarbonate Resin

A polycarbonate resin having a melt flow index (MI) of 13 g/10 min (Samsung SDI) is used. Here, the melt flow index is measured under conditions of 250° C./10 kg in accordance with ISO 1133.

(B-2) Recycled Polycarbonate Resin

A polycarbonate resin recycled from waste water bottles and having a melt flow index of 14 g/10 min (DG Chem.) is used. Here, the melt flow index is measured under conditions of 250° C./10 kg in accordance with ISO 1133.

(C) Impact Modifier

A core-shell type acrylonitrile-butadiene-styrene graft copolymer (g-ABS) prepared by grafting 42 parts by weight of a monomer mixture composed of 25 wt % of acrylonitrile and 75 wt % of styrene to 58 parts by weight of a polybutadiene rubber polymer (core) having an average particle diameter of 270 nm is used.

(D) Polyethylene Terephthalate Resin (D-1) Polyethylene Terephthalate Resin

A polyethylene terephthalate resin having an inherent viscosity of about 0.8 g/dL (SKYPET BL 8050, SK Chemicals) is used.

(D-2) Recycled Polyethylene Terephthalate Resin

A recycled polyethylene terephthalate resin having an inherent viscosity of about 0.72 g/dL (SAMYANG ENGINEERING PLASTICS) is used.

Examples 1 to 7 and Comparative Examples 1 to 4

The above components are placed in a twin-screw extruder at 250° C. in amounts as listed in Table 1, followed by melt extrusion, thereby preparing a thermoplastic resin composition in pellet form. The prepared pellets are dried at 80° C. for 2 hours or more, followed by injection molding using a 60 oz. injection machine at a cylinder temperature of 250° C. and at a mold temperature of 60° C., thereby preparing a specimen for property evaluation. The prepared specimen is evaluated as the following properties, and results are shown in Table 1.

Property Evaluation (1) Heat resistance (° C.): Heat deflection temperature (HDT) is measured on a 6.4 mm thick specimen at a load of 18.56 kgf/cm$^2$ in accordance with ASTM D648.

(2) Impact resistance (kgf·cm/cm): Notched Izod impact strength is measured on a ⅛" thick notched Izod specimen at 23° C. in accordance with ASTM D256.

(3) Generation amount of volatile organic compounds (VOCs) (area): 2 g of pellets are left at 120° C. for 5 hours using a static headspace sampler, and a generation amount of VOCs is measured using a gas chromatography system (GC-6890N), followed by representing the amount by peak area according to time.

(4) Fogging test (ppm): 4 g of pellets are placed in a petri dish, which in turn is covered with a lid to be sealed off and left at 250° C. for about 3 hours, followed by measuring a weight of a deposit on the lid and converting the measure value into ppm, thereby finding a generation amount of VOCs.

(5) Shrinkage (%): A circular specimen having a diameter of 100 mm and a thickness of 3.2 mm is prepared by injection molding in accordance with ASTM D955 B type, and dimensions of the specimen are measured using a 3D measurement instrument, followed by calculating shrinkage of the specimen.

(6) Chemical resistance (%): A specimen for evaluation of Izod impact strength is immersed in a thinner (P.C.B #8100, AK CHEMTECH. Co., Ltd.), as a diluent for paints, for 3 minutes, followed by calculating a rate of change in impact strength before/after immersion. A lower rate of change in impact strength indicates higher chemical resistance.

TABLE 1

| | | Example | | | | | | | Comparative Example | | | |
|---|---|---|---|---|---|---|---|---|---|---|---|---|
| | | 1 | 2 | 3 | 4 | 5 | 6 | 7 | 1 | 2 | 3 | 4 |
| (A) (wt %) | (A-1) | 35 | 35 | 35 | 35 | 45 | 45 | 40 | 50 | 40 | 80 | 35 |
| | (A-2) | 15 | 15 | 15 | 15 | 15 | 15 | — | 30 | 30 | — | 15 |
| (B) (wt %) | (B-1) | — | 20 | 20 | — | 20 | — | — | — | — | — | — |
| | (B-2) | 20 | — | — | 20 | — | 20 | 20 | — | — | — | — |
| (C) (wt %) | | 20 | 20 | 20 | 20 | 20 | 20 | 20 | 20 | 30 | 20 | 20 |
| (D) (wt %) | (D-1) | — | 10 | — | 10 | — | — | — | — | — | — | 30 |
| | (D-2) | 10 | — | 10 | — | — | — | 20 | — | — | — | — |
| Heat resistance (° C.) | | 106 | 106 | 106 | 106 | 105 | 105 | 104 | 104 | 98 | 83 | 100 |
| Impact resistance (kgf · cm/cm) | | 23 | 24 | 24 | 22 | 26 | 25 | 28 | 15 | 22 | 28 | 12 |
| Generation amount of VOC (area) | | 100 | 90 | 95 | 95 | 115 | 120 | 85 | 250 | 320 | 350 | 95 |
| Fogging (ppm) | | 320 | 300 | 310 | 310 | 320 | 330 | 290 | 740 | 860 | 760 | 300 |
| Shrinkage (%) | | 0.75 | 0.75 | 0.75 | 0.75 | 0.73 | 0.73 | 0.75 | 0.72 | 0.78 | 0.76 | 0.80 |
| Chemical resistance (%) | | 25 | 24 | 25 | 25 | 28 | 28 | 24 | 47 | 42 | 55 | 27 |

From the results shown in Table 1, it can be seen that the thermoplastic resin compositions of Examples 1 to 7 have excellent properties in terms of heat resistance, impact resistance, VOC level, shrinkage, and chemical resistance.

Therefore, it is demonstrated that the numerical limitations as described above can have critical significance on the thermoplastic resin composition according to the present invention by providing excellent properties and a low level of VOC emissions.

Although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A heat resistant thermoplastic resin composition comprising:
   about 100 parts by weight of an aromatic vinyl compound;
   about 20 parts by weight to about 60 parts by weight of a polycarbonate resin based on about 100 parts by weight of the aromatic vinyl compound;
   about 30 parts by weight to about 60 parts by weight of an impact modifier based on about 100 parts by weight of the aromatic vinyl compound; and
   about 15 parts by weight to about 55 parts by weight of a polyethylene terephthalate resin based on about 100 parts by weight of the aromatic vinyl compound.

2. The heat resistant thermoplastic resin composition according to claim 1, wherein the impact modifier is a rubber-modified aromatic vinyl copolymer.

3. The heat resistant thermoplastic resin composition according to claim 2, wherein the rubber-modified aromatic vinyl copolymer comprises a rubber polymer having an average particle diameter of about 200 nm to about 400 nm in an amount of about 40 wt % to about 60 wt % based on the total weight of the rubber-modified aromatic vinyl copolymer.

4. The heat resistant thermoplastic resin composition according to claim 1, wherein the polycarbonate resin is a recycled polycarbonate resin.

5. The heat resistant thermoplastic resin composition according to claim 1, wherein the polyethylene terephthalate resin is a recycled polyethylene terephthalate resin.

6. The heat resistant thermoplastic resin composition according to claim 1, further comprising: inorganic fillers in an amount of about 0.5 parts by weight to about 4 parts by weight based on about 100 parts by weight of the aromatic vinyl compound.

7. The heat resistant thermoplastic resin composition according to claim 1, wherein the aromatic vinyl compound comprises at least one of an aromatic vinyl-vinyl cyanide copolymer and a heat resistant modified vinyl copolymer.

8. The heat resistant thermoplastic resin composition according to claim 7, wherein the heat resistant modified vinyl copolymer includes a repeat unit derived from a monomer comprising at least one of α-methylstyrene, maleic anhydride, nucleus-substituted maleimide, and N-substituted phenyl maleimide.

9. The heat resistant thermoplastic resin composition according to claim 7, comprising a weight ratio of the aromatic vinyl-vinyl cyanide copolymer to the heat resistant modified vinyl copolymer of from about 1.5:about 1 to about 4:about 1.

10. The heat resistant thermoplastic resin composition according to claim 1, wherein the heat resistant thermoplastic resin composition has a heat deflection temperature (HDT) of about 104° C. or higher, as measured on an about 6.4 mm thick specimen at a load of about 18.56 kgf/cm² in accordance with ASTM D648, and has a notched Izod impact strength of about 20 kgf cm/cm to about 40 kgf cm/cm, as measured in accordance with ASTM D256.

11. The heat resistant thermoplastic resin composition according to claim 1, wherein the heat resistant thermoplastic resin composition has a level of VOC emissions of about 120 areas or less, as measured by a process in which about 2 g of pellets prepared from the heat resistant thermoplastic resin composition are left at 120° C. for 5 hours using a static headspace sampler and a generation amount of VOCs is measured by gas chromatography, followed by representing the amount by peak area according to time.

12. The heat resistant thermoplastic resin composition according to claim 1, wherein the heat resistant thermoplastic resin composition has a level of VOC emissions of about 400 ppm or less, as measured by a process in which about 4 g of pellets prepared from the heat resistant thermoplastic resin composition are placed in a petri dish and the dish is covered with a lid to be sealed off and left at 250° C. for about 3 hours, followed by measuring a weight of a deposit on the lid and converting the measured value into ppm.

13. A molded article manufactured using the heat resistant thermoplastic resin composition according to claim 1.

14. The heat resistant thermoplastic resin composition according to claim 1, wherein the heat resistant thermoplastic resin composition has a level of VOC emissions of 100 areas or less, as measured by a process in which about 2 g of pellets prepared from the heat resistant thermoplastic resin composition are left at 120° C. for 5 hours using a static headspace sampler and a generation amount of VOCs is measured by gas chromatography, followed by representing the amount by peak area according to time.

15. The heat resistant thermoplastic resin composition according to claim 14, wherein the aromatic vinyl compound is an aromatic vinyl-vinyl cyanide copolymer and/or a heat resistant modified aromatic vinyl copolymer consisting of repeat units derived from aromatic vinyl monomer, maleic anhydride, nucleus-substituted maleimide, and/or N-substituted phenyl maleimide.

16. The heat resistant thermoplastic resin composition according to claim 15, wherein the aromatic vinyl-vinyl cyanide copolymer is a styrene-acrylonitrile copolymer and wherein the heat resistant modified aromatic vinyl copolymer is a phenyl maleimide-styrene-maleic anhydride copolymer.

17. The heat resistant thermoplastic resin composition according to claim 15, comprising both the aromatic vinyl-vinyl cyanide copolymer and the heat resistant modified aromatic vinyl copolymer.

18. The heat resistant thermoplastic resin composition according to claim 17, comprising a weight ratio of the aromatic vinyl-vinyl cyanide copolymer to the heat resistant modified aromatic vinyl copolymer of from about 1.5:about 1 to about 4:about 1.

19. The heat resistant thermoplastic resin composition according to claim 15, wherein the impact modifier is a rubber-modified aromatic vinyl graft copolymer and/or a rubber-modified aromatic vinyl copolymer in which rubber-modified vinyl graft polymer particles are dispersed in a matrix composed of a copolymer of vinyl monomers.

20. The heat resistant thermoplastic resin composition according to claim 19, wherein the impact modifier is an acrylonitrile-butadiene-styrene graft copolymer (g-ABS).

* * * * *